Figure 1:
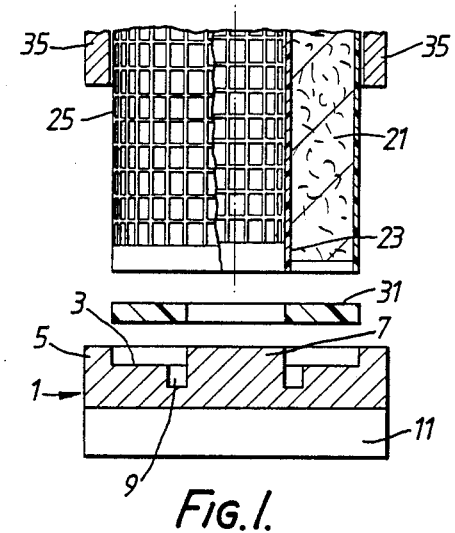

United States Patent [19]

Hurst

[11] Patent Number: 4,956,089

[45] Date of Patent: Sep. 11, 1990

[54] FORMING AN END-CAP ON A FILTER CARTRIDGE

[76] Inventor: Stephen Hurst, 52 The Street, West Horsley, Leatherhead, Surrey, United Kingdom, KT24 6AX

[21] Appl. No.: 45,157

[22] Filed: Apr. 21, 1987

Related U.S. Application Data

[63] Continuation of Ser. No. 823,502 filed as PCT GB85/00198 on May 10, 1985 published as WO85/05286 on Dec. 5, 1985 abandoned.

[30] Foreign Application Priority Data

May 10, 1984 [GB] United Kingdom ................ 8411912

[51] Int. Cl.$^5$ ............................................. B01D 27/08
[52] U.S. Cl. .................... 210/484; 210/493.2; 210/493.5; 210/500.32; 156/218; 264/242; 264/DIG. 48; 264/328.1
[58] Field of Search ................ 55/498, 500, 502, 520, 55/DIG. 5; 210/450, 493.1, 493.2, 493.5, 484, 500.32, 500.3; 156/69, 218, 309.6; 264/162, 242, 249, 259, 261, 262, 263, 272, 273, 275, 277, 318, 334, DIG. 48; 249/100, 127, 150, 183

[56] References Cited

U.S. PATENT DOCUMENTS

| | | |
|---|---|---|
| 2,895,174 | 7/1959 | Hockett . |
| 3,026,609 | 3/1962 | Bryan . |
| 3,457,339 | 7/1969 | Pall et al. .............................. 264/162 |
| 3,716,436 | 2/1973 | Pall et al. .............................. 156/218 |
| 4,033,881 | 7/1977 | Pall ..................................... 210/493.2 |
| 4,078,036 | 3/1978 | Keefer ................................. 264/261 |
| 4,220,477 | 9/1980 | Kesting ................................. 264/41 |
| 4,392,958 | 7/1983 | Ganzi et al. ........................ 210/493.2 |
| 4,512,892 | 4/1985 | Ganzi et al. ........................ 210/493.2 |
| 4,579,698 | 4/1986 | Meyering et al. ................. 210/493.2 |
| 4,588,464 | 5/1986 | Miyagi et al. ........................ 156/218 |
| 4,623,467 | 11/1986 | Hamlin .............................. 210/257.2 |

FOREIGN PATENT DOCUMENTS

| | | | |
|---|---|---|---|
| 757121 | 3/1971 | Belgium ........................... 210/493.2 |
| 0044042 | 1/1982 | European Pat. Off. . |
| 2429474 | 11/1975 | Fed. Rep. of Germany ... 210/493.2 |
| 1485128 | 9/1977 | United Kingdom ............. 210/493.2 |
| 2134811 | 8/1984 | United Kingdom ............. 210/493.2 |
| 2140317 | 11/1984 | United Kingdom ............. 210/493.2 |

Primary Examiner—Richard V. Fisher
Assistant Examiner—Wanda L. Millard
Attorney, Agent, or Firm—Kane, Dalsimer, Sullivan, Kurucz, Levy, Eisele and Richard

[57] ABSTRACT

An end-cap for a filter cartridge is formed by melting the thermoplastic material of a supporting cage and of a support pleated together with the filter medium against a heated die and embedding the end of the filter medium in the material while it is molten. Extra thermoplastic material may be melted in the die. If all of the components of the cartridge are thermoplastic, then they all fuse together and contribute to the end-cap.

33 Claims, 1 Drawing Sheet

U.S. Patent      Sep. 11, 1990      4,956,089

FORMING AN END-CAP ON A FILTER CARTRIDGE

RELATED PATENT APPLICATIONS

This application is a continuation of 06/823,502 filed as PCT GB85/00198 on May 10, 1985 published as WO85/05286 on Dec. 5, 1985 which has been abandoned.

The invention relates to filters, and especially to cartridge filters for microfiltration.

Cartridge filters are often arranged in an annular form, with one or more sheets of filter medium, and where appropriate one or more sheets of a support, pleated and formed into a cylindrical annulus and the pleats running the length of the cylinder. The pleated filter medium may then be supported and protected by cylindrical cages of perforate material forming a hollow inner core and/or an outer sleeve. The ends of the assembly are closed by end-caps which are secured to the inner and outer cages to give mechanical strength to the cartridge and to the ends of the pleated filter to form a seal that prevents leakage round the filter medium. With a microporous membrane filter, for example, the largest particles that can pass through the membrane are typically between 0.1 μm and 5 μm across, depending on the rating of the membrane, and the seal between the end-caps and the ends of the membrane must be at least as good as the medium used.

It has been known for many years to embed the ends of the filter cartridge and of the inner and outer cages in a thermosetting sealant, for example, an epoxy resin, usually with an outer structural cap. The advantage of that system is that the sealant is comparatively slow to set, giving an open time of perhaps 15 minutes, so that it is easy to ensure that the end of the cartridge is properly embedded in the sealant and it can be embedded several millimeters deep into the sealant, giving a secure seal. Filters capped by these methods cannot be used for some purposes, however, because the sealants used contain components that can escape into and contaminate a liquid being filtered.

In U.S. Pat. No. 3 457 339 it is proposed to provide a disc or disc annulus of thermoplastic material, melt its upper surface with a burner, and embed the filter cartridge in the melt. A disadvantage of that system is that the disc remains molten only for a few seconds, so that the filter membrane can be embedded only a fraction of a millimeter into the disc and even if the end of the filter is cut exactly flat defective bonds may occur, and such defects cannot in practice be remedied. Also, that process subjects the cartridge to considerable mechanical stresses, rendering it unsuitable for weak or brittle media, and the high temperature of the molten surface of the disc, which is the hottest part, means that some other filter media cannot be used with that technique.

In British Patent No. 1 199 005 is proposed to spin weld end caps to thermoplastic strips provided at the ends of a filter element between layers of filter material. The heat generated by friction creates sufficient heat to melt the end cap surfaces and the ends of the thermoplastic strips with the result that the strips become welded to the end caps and the fibrous body is said to become embedded in the end cap surfaces. A disadvantage of that process is that the filter body can be embedded only in the outer surface of the end cap, if at all, so that, as in the proposal of U.S. Pat. No. 3 457 339, there is a high risk of defects occurring in the bond between the filter body and the end caps.

The invention provides a method of forming an end-cap on a filter cartridge comprising a filter medium and at least one supporting member of thermoplastic plastics material extending the length of the cartridge adjacent to the medium, which method comprising bringing the end of the cartridge into engagement with a heated die at a temperature high enough to melt the material of the supporting member or members, and embedding and/or fusing an end portion of the filter medium in the molten material, the molten material forming an end-cap with the filter medium sealingly embedded in or fused to it.

The invention also provides a filter cartridge comprising a filter medium, at least one supporting member of thermoplastic plastics material extending the length of the filter cartridge adjacent to the medium, and at least one end-cap of thermoplastic plastics material fused to and integral with the supporting member or members, in which end-cap an end portion of the filter medium is sealingly fused and/or embedded.

Preferably, the end-cap is formed at least partially by fusion of the material of the supporting member or members.

The filter medium is advantageously in sheet form and arranged to form a three-dimensional body the end faces of which are formed by a zigzagging edge of the medium. Preferably, the medium is pleated, with the pleats extending longitudinally of the body. The three dimensional body may be an annulus of a cylinder, and the pleats then preferably extend axially forming generally radial portions spaced apart circumferentially. Instead, the body may be cuboidal with the pleats extending longitudinally or laterally and forming portions extending across the thickness of the body.

At least one supporting member is then preferably a layer of material lying adjacent to the surface of the filter medium within the body and, where the filter medium is pleated, is preferably a sheet of material substantially co-extensive with the filter medium and pleated together therewith. Advantageously, the material forming the body is a sandwich of one or more layers of filter medium between two layers of support, the support also serving to space the pleats apart and permit free flow of the material to be filtered between the pleats, but some filter media, especially fairly coarse ones, may be self-supporting.

Instead or in addition, at least one supporting member may be a cage in the form of a perforate member lying adjacent to a surface of the said body. When the three-dimensional body is in the form of a cylindrical annulus, the supporting cages are preferably in the form of cylindrical tubes providing an inner hollow core and an outer sleeve lying adjacent to the inner and outer surfaces of the body. The end-cap is then preferably in annular form, extending between the inner and outer cages. The annulus is preferably a symmetrical annulus of a right circular cylinder. Usually, however, such cages will not melt fast enough to contribute much to the material of the end cap, but will only fuse with an end-cap of molten thermoplastic material largely from other sources.

In order to increase the amount of thermoplastic material present, a piece of thermoplastic material, which may be the same as or different from the material of any of the supporting members of the cartridge, may be melted in the die before the cartridge is brought into engagement therewith, or may be placed in the die and melted while the cartridge is in engagement with the die. It has been found that such extra thermoplastic material is advantageous when the filter medium itself is not thermoplastic, even when it is laminated with thermoplastic supports before it is pleated.

Preferably, the end of the cartridge is moved downwards into engagement with an upwardly-facing surface of the die, which is preferably provided with a raised rim defining a surface engaged by the end of the cartridge to prevent the molten material from escaping and/or to shape the longitudinally extending surfaces of the end-cap. The die may be so shaped as to form on the outside of the end-cap protrusions, recesses, or other structures to assist in connecting the filter cartridge to other cartridges or devices, for example, adaptors or connectors, or a mounting to which such adaptors or connectors may readily be attached. Other orientations may be used instead, and in some cases it is advantageous to position the cartridge horizontally, especially when, as may be preferable, both end-caps of a cartridge are formed simultaneously.

It has been found that is is possible with a method according to the invention to seal, quickly and reliably, both, for example, prefiltration cartridges and microporous membrane cartridges of which both the filter membrane and the supporting cage may be made of thermplastic material such as polypropylene, and cartridges in which the filter membrane is of another material.

Because the die is heated from underneath, the temperature of the molten material can be controlled very precisely, and can give a comparatively long process time of from 30 seconds to 5 minutes or even longer, so that the filter can be embedded more deeply, more precisely, and more gently into the end-cap than is usually practical with the method of U.S. Pat. No. 3 457 339. Also, because the hottest part of the molten material is the bottom, if the filter material is affected by the heat any damage will be least at the surface, where the affected portion joins onto the unaltered material of the filter, and most severe at the very end of the filter material, which is sunk deep into the end-cap; that is found to be the stablest arrangement. Further, if the seal between the filter and the end-cap is found to be defective the process can be repeated to give a further attempt at sealing the end, which could be done neither with thermosetting sealants such as epoxy resins nor with the method of U.S. Pat. No. 3 457 339.

The filter medium may consist of a known filtration material, such as PTFE, nylon, polyester, polypropylene, or cellulose materials such as paper or cellulose tri-acetate, which may be faced on one or both sides with a supporting member in the form of a material having a larger mesh or pore size. Cellulose tri-acetate media are preferred for many purposes, because they have been used for many years and their properties and behaviour in service are well known. Microporous membranes of cellulose tri-acetate are, however, too brittle to be used satisfactorily in the process of U.S. Pat. No. 3 457 339, with the result that their use in circumstances where thermosetting sealants were not acceptable has been limited.

If the filter medium comprises a cellulose tri-acetate membrane, the temperature of the die is preferably sufficient that the cellulose tri-acetate collapses from the microporous, hydrophilic, form used for filter membranes into a solid film, which is believed to be hydrophobic in nature, where it is in contact with the molten thermoplastics material. The hydrophilic form does not seal satisfactorily to the plastics materials used; in the presence of water it becomes pliable and can pull out of the plastics end-cap. The hydrophobic form gives a stabler and more secure anchorage. The temperature at which the cellulose tri-acetate softens and collapses is within 10° C. of that at which it begins to degrade, but with the present invention such temperature control is possible and, because the temperature is lowest at the surface of the molten material, the side towards the body of the filter, a gradual transition from the microporous to the solid state can be achieved without special expedients being necessary.

The length of the filter cartridge measured to an axially outer face of the end-cap after the end-capping operation is completed may be less than the overall length of the cartridge before formation of the end cap, especially if the filter medium is a thermoplastic material that melts, or cellulose tri-acetate or other material that contracts or collapses, during the end-capping process. It is then possible to accommodate irregularities of as much as several millimeters in the end surface of the filter body, and to do so without the need for large quantities of extra material to be added to the melt.

A further advantage of the present invention is that, because the end-caps are in a single piece with the inner and outer cages, it is easy to form a cartridge of the considerable mechanical strength which can be necessary because in use cartridge filters are often secured into filter housings by a bayonet or screw fitting at the bottom of the housing while the cartridge can only be handled by a fitting at the other end, so that the torque necessary to secure or release the cartridge must be transmitted from one end-cap to the other through the inner and outer cages and the joins between the cages and the end-caps. With previously proposed end-caps it was sometimes necessary to provide, for example, crenallated ends to the cages in order to achieve the desired torsional strength, with a consequent increase in manufacturing costs, complexity, and dimensional problems.

The invention also provides a filter cartridge with at least one end-cap formed by a method according to the invention.

A filter cartridge according to the invention may be incorporated simultaneously with, or subsequently to, the formation of the end-caps into an assembly with any desired form of connector, adaptor or closure at either or both ends, a plurality of such cartridges joined together to form a cartridge assembly or modular construction, or a housing with means defining paths for a fluid to flow to and from the filter, and the present invention further provides a filter assembly incorporating a filter cartridge in accordance with the invention.

Figure 2:
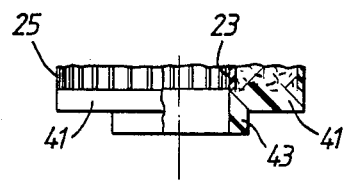

One form of method of and apparatus for forming an end-cap in accordance with the present invention, and a filter cartridge constructed in accordance with it, will now be described by way of example only with reference to the accompanying drawings, in which:

FIG. 1 is a fragmentary axial section through a die for forming an end-cap and a cartridge ready for the formation of an end-cap; and FIG. 2 is a fragmentary side elevation view, partly in cross-section, of a cartridge with a formed end-cap.

Referring to the accompany drawings, a die indicated generally by the reference numeral 1 has an annular upwardly-facing surface 3 between an outer rim 5 and an inner raised core 7. At the inner edge of the annular surface 3, immediately adjacent to the raised core 7, is an annular recess or groove 9. The underside of the die 1 is in thermal contact with a thermostatically controlled heater 11 (not shown in detail). Instead, the heater 11 may be integral with the die 1.

A filter cartridge is assembled from a structure 21, comprising a filter medium between two thermoplastic supports, pleated into a compact body and formed into a hollow cylinder, with the pleats running lengthways of the cylinder, between inner and outer supporting cages 23 and 25, respectively. Each of the cages 23 and 25 consists of a tube of thermoplastics material, for example, polypropylene, perforated or in the form of a grid or the like to allow a liquid or gas that is to be filtered to pass through it freely, except that the end portions are solid, although instead the entire cage may be perforated. The cages 23 and 25 may extend slightly beyond the filter medium at each end, or may be slightly shorter or the same length. Because of practical limitations in the pleating process, the end faces of the filter 21 are somewhat uneven.

In order to form the end-cap on the cartridge, the die 1 is heated to a temperature slightly above the melting point of the material of the supporting layers of the filter 21 and of the cages 23 and 25. A disc or ring 31 of the same or a different thermoplastic material may be melted in the die to increase the amount of molten material present, especially if the actual filter medium is of a material that is not thermoplastic or has a melting point above the temperature of the die 1. If the disc 31 is of a different material from the cages 23 and 25 and the supporting layers of the filter 21, then the die must be heated above the higher melting point. If the thermoplastic material is polypropylene then, depending on the exact composition, the process temperature may be, for example, 230° to 250° C.

The end of the filter cartridge is brought into contact with the surface 3 of the die 1, the filter cartridge being located and guided by guide means 35 (not shown in detail), and the supporting layers of the filter 21 and the end portions of the cages 23 and 25 are melted by the heat of the die. If the filter medium 21 consists of or includes a thermoplastic material with an appropriate melting point, for example, if the filter is a polypropylene pre-filter, that will also melt. If the filter 21 includes a non-thermoplastic or high-melting material, that material will become embedded in the molten material. If the filter comprises a porous cellulose tri-acetate membrane the temperature of the die is preferably so selected that the cellulose tri-acetate collapses into the solid, hydrophobic, state where it is immersed in the molten material, without degrading.

As has been discussed above, the molten material consists mostly of the supporting layers of the filter 21, the filter medium if that melts, and the disc 31 if one has been included. The cages 23 and 25 are too heavy to melt quickly, and do not usually contribute more than the material needed to fuse into the end-cap 41 at the ends of the cages.

If the filter medium melts, or is of cellulose tri-acetate or other material that collapses or contracts at the temperature of the die 1, then the filter cartridge may be advanced into the die until the most recessed points on the end face of the filter 21 are in satisfactory engagement with the molten material, with the most prominent points being melted away or collapsed. As a result, the distance between the outer faces of the end caps may be appreciably less than the length of the cartridge before the end caps are formed, in contrast to most previously proposed end-capping processes, which would leave the cartridge longer than it started. For example, the pleated filter cartridge 21 may have an overall length of about 250 mm before the end-caps are formed while the outer faces of the formed end caps may be 245 mm apart.

When a sufficient amount of the thermoplastic material has melted and the end of the filter is sufficiently embedded or fused, the die 1 is allowed to cool and in the thermoplastic material is allowed to solidify. The cartridge, as shown in FIG. 2, has the inner and outer cages 23 and 25 fused with an annular end-cap 41 and the filter medium of the filter 21 embedded in and/or also fused with the end-cap. On the outer face of the end-cap is a flange 43, formed by the recess 9 in the face of the die, surrounding a central aperture formed by the raised core 7 of the die. The flange 43 facilitates welding of the cartridge to other components similarly provided, and another shape may instead by given to the outside face of the end-cap 41 if desired, by a corresponding change in the shape of the die 1. Instead of the one-piece die 1 shown, the die 1 may be more than one piece especially if any protrusions or recesses are to be provided in a circumferential face of the end-cap, for example, if a groove for an O-ring is to be provided.

If it is found that leakage occurs past the filter as a result of the filter medium not being properly embedded in the end-cap 41 over the whole extent of its end edge, the die 1 may be re-heated, the cartridge re-inserted into it, the end-cap 41 re-melted, and a further attempt made to form a proper seal. That is especially advantageous in the case of the more expensive filter media, where having to discard defective filters could be a matter of significant concern.

What we claim is:

1. A method of forming an end-cap on a filter cartridge comprising a filter medium and at least one supporting member of thermoplastic plastics material extending the length of said cartridge adjacent said medium, which method comprises bringing an end of said cartridge into engagement with a heated die at a temperature high enough to melt said material of said supporting member or members, and forming with said molten material an end-cap having an end portion of said filter medium sealingly embedded in or fused to it, wherein the length of said filter cartridge measured to an axially outer face of said end-cap is less than the overall length of said cartridge before formation of said end-cap.

2. A method as claimed in claim 1, wherein said filter medium is in sheet form and is pleated to form a three-dimensional body the end faces of which are formed by a zigzagging edge of said medium.

3. A method as claimed in claim 2, wherein at least one said supporting member is a layer of material lying adjacent the surface of said filter medium within said body, and said filter medium and said at least one supporting member are substantially co-extensive and are pleated together to form said body.

4. A method as claimed in claim 2, wherein at least one said supporting member is a cage in the form of a perforate member lying adjacent a surface of said body.

5. A method as claimed in claim 1, wherein the filter medium comprises a microporous membrane.

6. A method as claimed in claim 5, wherein said filter medium comprises a microporous membrane of cellulose tri-acetate in a porous hydrophilic state, said cellulose tri-acetate being at least partially collapsed into a hydrophobic state by the heat where it is immersed in the molten material.

7. A method as claimed in claim 1, wherein said end of said cartridge is brought into engagement with an upwardly facing surface of said die.

8. A method as claimed in claim 1, wherein said die is provided with a rim defining a surface engaged by said end of said cartridge.

9. A method as claimed in claim 1, wherein said die is so shaped as to mould one or more protrusions and/or recesses on the outside of said end-cap.

10. A method of forming an end-cap on a filter cartridge comprising a filter medium and at least one supporting member of thermoplastic plastics material extending the length of said cartridge adjacent said medium, which method comprises bringing an end of said cartridge into engagement with a heated die at a temperature high enough to melt said material of said supporting member or members, and forming an end-cap entirely from said molten material of said supporting member or members having an end portion of said filter medium sealingly embedded in or fused to it.

11. A method as claimed in claim 10, wherein the filter medium is in sheet form and is pleated to form an annulus of a cylinder, wherein pleats extend axially, forming generally radial portions spaced apart circumferentially, and the end faces of said cylinder annulus are formed by a zigzagging edge of said medium.

12. A method as claimed in claim 11, wherein at least one said supporting member is a layer of material lying adjacent the surface of said filter medium within said cylinder annulus and said filter medium and said at least one supporting member are substantially co-extensive and are pleated together to form said cylinder annulus.

13. A method as claimed in claim 12, wherein at least one said supporting member is a cage in the form of a perforate cylindrical tube lying adjacent a respective one of the inner and outer surfaces of said cylinder annulus.

14. A method of forming an end-cap on a filter cartridge comprising a filter medium and at least one supporting member of thermoplastic plastics material extending the length of said cartridge adjacent said medium, which method comprises bringing an end of said cartridge into engagement with a heated die at a temperature high enough to melt said thermoplastic material of said supporting member or members, melting an end portion of said supporting member or members, and forming with the molten material of said supporting member or members an end-cap having an end portion of said filter medium sealingly embedded in or fused to it, said end-cap being substantially integral with said supporting member or members.

15. A method as claimed in claim 14, wherein said filter medium is in sheet form and is arranged to form a three-dimensional body the end faces of which are formed by a zigzagging edge of said medium.

16. A method as claimed in claim 15, wherein said body is a symmetrical annulus of a right-circular cylinder, wherein pleats extend axially, forming generally radial portions spaced apart circumferentially.

17. A method as claimed in claim 16, wherein at least one said supporting member is a cage in the form of a perforate cylindrical tube lying adjacent one of the inner and outer surfaces of said body.

18. A method as claimed in claim 15, wherein at least one said supporting member is a layer of material lying adjacent the surface of said filter medium within said body, and said filter medium and said at least one supporting member are substantially co-extensive and are pleated together to form said body.

19. A method as claimed in claim 14, wherein a piece of thermoplastic material which may be of the same material as at least one said supporting member and/or of a different material from at least one said supporting member is melted in said die before or at the same time as the filter cartridge is brought into engagement therewith so as to form part of said molten material forming said end-cap.

20. A method as claimed in claim 14, wherein said filter medium comprises a microporous membrane.

21. A method as claimed in claim 14, wherein said filter medium comprises a layer of a cellulose material.

22. A method as claimed in claim 14, wherein the length of said filter cartridge measured to an axially outer face of said end-cap is less than the overall length of said cartridge before formation of said end-cap.

23. A filter cartridge comprising a filter medium, at least one supporting member of thermoplastic plastics material extending the length of said filter cartridge adjacent said medium, and at least one end-cap of thermoplastic plastics material integral with said supporting member or members and consisting at least partially of the material of said supporting member or members, in which end-cap an end portion of said filter medium is sealingly fused and/or embedded.

24. A filter cartridge as claimed in claim 23, wherein said filter medium is in sheet form and is pleated to form a three-dimensional body said end portion of which is formed by a zigzagging edge portion of said medium.

25. A filter cartridge as claimed in claim 24, wherein said body is an annulus of a cylinder and said pleats extend axially, forming generally radial portions spaced apart circumferentially.

26. A filter cartridge as claimed in claim 25, wherein at least one said supporting member is a layer of material lying adjacent the surface of said filter medium within said body, and said filter medium and said at least one supporting member are substantially co-extensive and are pleated together to form said body.

27. A filter cartridge cartridge as claimed in claim 26, which comprises two said supporting members in the form of cylindrical cages lying adjacent to the inner and outer surfaces respectively, of said body.

28. A filter cartridge as claimed in claim 24, wherein at least one said supporting member is a cage in the form of a perforate member lying adjacent a surface of the said body.

29. A filter cartridge as claimed in claim 23, wherein said filter medium comprises a microporous membrane.

30. A filter cartridge as claimed in claim 29, wherein said filter medium comprises a microporous membrane of cellulose tri-acetate in a porous hydrophilic form, said cellulose tri-acetate being at least partly collapsed into a hydrophobic form where it is embedded in said end-cap.

31. A filter cartridge as claimed in claim 23, having at least one protrusion and/or at least one recess moulded on the outside of at least one said end-cap.

32. A filter cartridge as claimed in claim 23, wherein said end-cap comprises material different from that of at least one said supporting member fused with said material of said supporting member.

33. A filter cartridge as claimed in claim 23, wherein said filter medium comprises a cellulose material.

* * * * *